United States Patent [19]

Miranti, Jr. et al.

[11] Patent Number: 4,559,029

[45] Date of Patent: * Dec. 17, 1985

[54] ENDLESS POWER TRANSMISSION V-BELT CONSTRUCTIONS

[75] Inventors: Joseph P. Miranti, Jr., Nixa; Mark P. Foley, Springfield; Gerald C. Hollaway, Springfield; Larry R. Oliver, Springfield; Paul M. Standley, Springfield; James A. Lewis, Springfield, all of Mo.

[73] Assignee: Dayco Corporation, Dayton, Ohio

[*] Notice: The portion of the term of this patent subsequent to Oct. 18, 2000 has been disclaimed.

[21] Appl. No.: 654,830

[22] Filed: Sep. 26, 1984

Related U.S. Application Data

[60] Continuation-in-part of Ser. No. 522,422, Aug. 11, 1983, Pat. No. 4,494,947, which is a division of Ser. No. 348,106, Feb. 11, 1982, Pat. No. 4,410,314.

[51] Int. Cl.$^4$ ............................................... F16G 1/28
[52] U.S. Cl. ....................................... 474/251; 474/205
[58] Field of Search ............... 474/251, 262, 263, 205; 156/138, 139

[56] References Cited

U.S. PATENT DOCUMENTS

| | | | |
|---|---|---|---|
| 1,611,829 | 12/1926 | Freedlander | 156/138 |
| 1,890,080 | 12/1932 | Freedlander | 474/251 X |
| 2,514,429 | 7/1950 | Waugh | 474/263 X |
| 3,464,875 | 9/1969 | Brooks et al. | 156/162 X |
| 3,988,941 | 11/1976 | Smith | 474/251 |
| 4,106,966 | 8/1978 | Brooks | 156/138 |
| 4,131,030 | 12/1978 | White | 474/262 |
| 4,137,787 | 2/1979 | Waugh | 474/263 |
| 4,228,692 | 10/1980 | Jacob et al. | 474/251 |
| 4,276,039 | 6/1981 | Takano | 474/205 |
| 4,410,314 | 10/1983 | Miranti et al. | 474/251 |

Primary Examiner—James A. Leppink
Assistant Examiner—Frank McKenzie
Attorney, Agent, or Firm—Joseph V. Tassone

[57] ABSTRACT

An endless power transmission V-belt construction and method of making the same are provided, the belt construction being formed mainly of polymeric material and having rounded top and bottom teeth respectively extending along the length of the top and bottom surfaces of the belt construction, the belt construction comprising a tension section having the top surface, a compression section having the bottom surface, and a load-carrying section disposed intermediate the tension section and the compression section. The bottom to top tooth pitch ratio of the belt construction, the bottom to top tooth depth ratio thereof, and the belt thickness to flex thickness ratio thereof may be varied in specific instances to optimize performance in specific uses.

20 Claims, 6 Drawing Figures

ENDLESS POWER TRANSMISSION V-BELT CONSTRUCTIONS

This application is a continuation-in-part of Ser. No. 522,422, filed Aug. 11, 1983, now U.S. Pat. No. 4,494,947; said application being a division of Ser. No. 348,106, filed Feb. 11, 1982, now U.S. Pat. No. 4,410,314.

BACKGROUND OF THE INVENTION

1. Field of the Invention

This invention relates to an improved endless power transmission V-belt construction.

2. Prior Art Statement

It is known in the art to provide an endless power transmission V-belt construction formed mainly of polymeric material and having rounded top and bottom teeth respectively extending along the length of the top and bottom surfaces of the belt construction, the belt construction comprising a tension section having the top surface, a compression section having the bottom surface, and a load-carrying section disposed intermediate the tension section and the compression section.

For example, see the following two U.S patents:
(1) U.S. Pat. No. 1,890,080—Freedlander
(2) U.S. Pat. No. 3,988,941—Smith.

It appears that the endless power transmission V-belts of items (1) and (2) above each has the top and bottom rounded teeth thereof formed of substantially the same cross-sectional configuration.

Grandparent application, Ser. No. 348,106, was foreign filed in Great Britain, Germany, France, Sweden and Japan. The specification of Ser. No. 348,106 has been laid open to the public in Japan on Jan. 5, 1984; in Germany on Aug. 18, 1983; and in Great Britain on Feb. 29, 1984.

SUMMARY OF THE INVENTION

It is one feature of this invention to provide an improved endless power transmission V-belt construction that is particularly adapted for continuously variable transmission use for transportation vehicles or the like.

In particular, it is well known that continuously variable transmission V-belt constructions are each ordinarily constructed with a large aspect ratio (ratio of top width to thickness), usually having a quotient between 2.0 and 4.0, in order to provide the greatest possible speed ratio. The top width of the belt construction is determined by the speed ratio and the tension required to transmit power, while the thickness is determined by the need for crosswise support and constrained by the minimum diameter required by the speed ratio and the required tension. These considerations are especially critical in transportation vehicle drives which are characterized by short belt lengths which allow insufficient cooling of the belt constructions on each revolution thereof. Accordingly, the belt construction must be thick enough to prevent inward collapse or excessive crosswise flex (dishing) and yet thin enough to flex over the minimum diameter required by the drive.

V-belt constructions are commonly toothed, notched or corrugated to provide the required flexibility while maintaining enough thickness for crosswise support. Teeth also increase the heat transfer rate by increasing the surface area and the air flow around the belt, round teeth providing the shortest heat flow path to the outside of the belt construction from the center of each tooth. In certain belt construction applications, greater thickness is required to prevent collapse than can be achieved with a single tooth construction and therefore in such cases, the V-belt constructions are toothed both on the tops and bottoms thereof.

Therefore, it was found according to the teachings of this invention that a V-belt construction of the double rounded tooth type allows the maximum total belt construction thickness to be used for maximum crosswise support while providing the minimum "flex thickness" (the distance from the root plane of a top tooth to the root plane of a corresponding bottom tooth) and therefore could be utilized for continuously variable transmission purposes, although in certain specific applications, most commonly in larger belts, flat teeth are preferred in the double cog belt of the invention.

In particular, one embodiment of this invention provides an endless power transmission V-belt construction formed mainly of polymeric material and having top and bottom teeth respectively extending along the length of the top and bottom surfaces of the belt construction, the belt construction comprising a tension section having the top surface, a compression section having the bottom surface, and a load-carrying section disposed intermediate the tension section and the compression section. The bottom to top tooth pitch quotient of the belt construction is approximately 1.25 and the bottom to top tooth depth quotient thereof is approximately 1.92 while the belt thickness to flex thickness quotient is approximately 3.68. Belts having other specific dimensions and configurations have been found to be particularly useful in other specific applications in transportation vehicles or other machines using continuously variable transmissions.

Accordingly, it is an object of this invention to provide an improved endless power transmission V-belt construction having one or more of the novel features of this invention as set forth above or hereinafter shown or described.

Another object of this invention is to provide a method of making such an endless power transmission V-belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
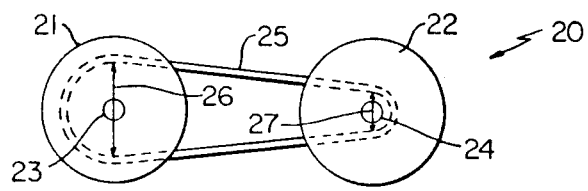
FIG. 1 is a schematic side view illustrating a typical continuously variable transmission unit.

While the various features of this invention are hereinafter illustrated and described as being particularly adapted to provide an endless power transmission V-belt construction for continuously variable transmission purposes, it is to be understood that the various features of this invention can be utilized singly or in various combinations thereof to provide belt constructions for other purposes.

Therefore, this invention is not to be limited to only the embodiment illustrated in the drawings, because the drawings are merely utilized to illustrate one of the wide variety of uses of this invention.

Referring now to FIG. 1, a typical continuously variable transmission unit for a transportation vehicle or the like is generally indicated by the reference numeral 20 and comprises a pair of adjustable sheave drive and driven pulleys 21 and 22 being respectively rotatably mounted by drive and driven shafts 23 and 24 having an endless power transmission V-belt construction 25 drivenly and drivingly disposed around the pulleys 21 and 22 which respectively can have the sheaves thereof adjusted in a manner well known in the art to have the belt construction 25 looped between maximum and minimum diameters as respectively represented by the arrows 26 and 27 in FIG. 1 in order to provide a continuously variable drive in a manner well known in the art.

As previously stated, in order for the unit 20 to provide the greatest possible speed ratio, the V-belt construction 25 is ordinarily constructed with a large aspect ratio (ratio of top width to thickness), such as where the quotient of said ratio is between 2.0 and 4.0.

Such an endless power transmission V-belt construction is provided by this invention and is generally indicated by the reference numeral 28 in FIGS. 2 and 3 and will now be described.

Figure 2:
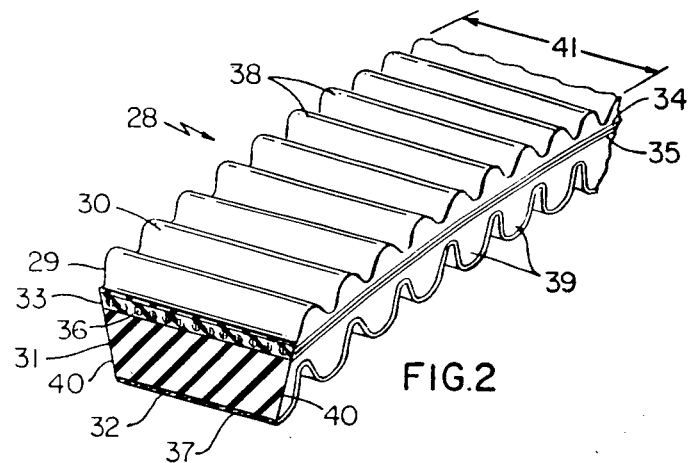
FIG. 2 is a fragmentary perspective view, partially in cross section, of the improved endless power transmission V-belt construction of this invention.
Figure 3:
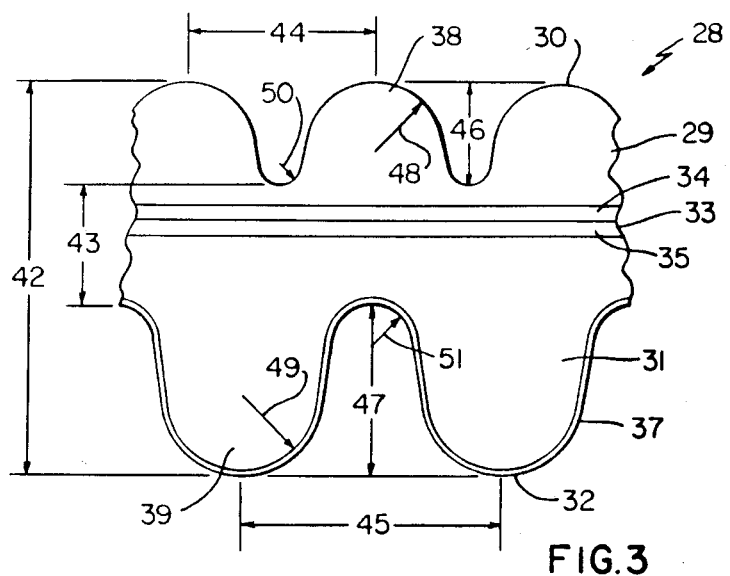
FIG. 3 is an enlarged fragmentary side view of the belt construction of FIG. 2.

As illustrated in FIGS. 2 and 3, the endless power transmission V-belt construction 28 of this invention comprises a tension section 29 that defines a top surface 30 of the belt construction 28, a compression section 31 that defines a bottom surface 32 of the belt construction 28, and a load-carrying or neutral axis section 33 disposed intermediate the tension section 29 and the compression section 31 in a conventional manner, the load-carrying section 33 comprising a top cushion or layer 34 and a bottom cushion or layer 35 with a load-carrying cord 36 helically wound therebetween in a manner well known in the belt construction art.

The belt sections 28, 31 and 33 and cord 36 are formed mainly of polymeric material, and, if desired, at least one of the tension section 29 the load-carrying section 33 and the compression section 31 can be fiber loaded (not shown) in a manner well known in the art. It has been found that the best properties are obtained in a belt when all three sections of the belt, 28, 31 and 33, are loaded with an aramid fiber and the lengths of said fiber are oriented transversely to the longitudinal axis of the belt. Also, if desired, one or more fabric layers, such as fabric layer 37 in FIGS. 2 and 3, can be disposed on at least one of the top and bottom surfaces 30 and 32 in a manner well known in the art.

While any suitable polymeric material can be utilized for the sections 29, 31 and 33, the same can comprise mainly neoprene with conventional fillers and binders as is conventional in the belt art.

The tension section 29 of the belt construction 28 is formed with a pluralily of rounded teeth 38 that extend substantially transverse to the longitudinal axis of the belt construction 28 and are substantially uniform to each other while extending along the entire length of the top surface 30 thereof as illustrated, the teeth 38 sometimes being referred to as cogs.

Similarly, the compression section 31 of the belt construction 28 has a plurality of bottom teeth 39 formed therein that extend substantially transverse to the longitudinal axis to the belt construction 28, are substantially uniform to each other and extend along the entire length of the bottom surface 32 of the belt construction 28 as illustrated, the teeth 39 also sometimes being referred to as cogs.

The belt construction 28 of this invention can be made in any manner known in the art for producing double toothed belts, sometimes referred to as double cogged belts, such as by forming the bottom teeth as set forth in U.S. Pat. Nos. 1,611,829; 3,464,875 or 4,106,966 (which three U.S. patents are being incorporated into this disclosure by this reference thereto) and by forming the top teeth as set forth in U.S. Pat. No. 4,106,966; using a preformed top teethed pad or using a toothed matrix with a collapsible curing jacket, whereby the resulting belt construction 28 has opposed uncovered driving side edges 40, such as cut side edges or plate finished side edges, that cooperate with the top and bottom surfaces 30 and 32 to define the conventional trapezoidal cross-sectional configuration as illustrated in FIG. 2. The belt construction 28 of this invention is formed so that the aspect ratio thereof; as defined by the ratio of the top width of the belt construction 28, indicated by the reference numeral 41 in FIG. 2, to the belt thickness, indicated by the reference numeral 42 in FIG. 3; is preferably between 2.0 and 4.0, in order to provide a variable speed V-belt construction. In certain very special cases, it has been found that a belt having an aspect ratio quotient somewhat less than 2 can be used.

Figure 4:
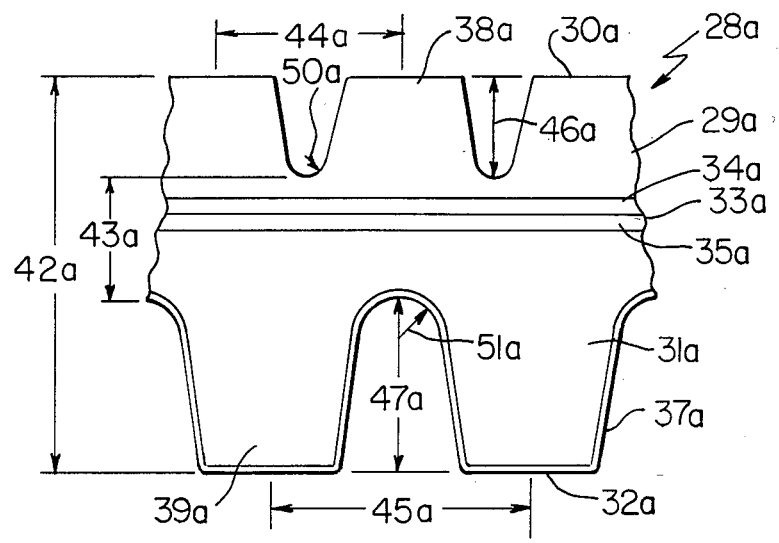
FIG. 4 is an enlarged fragmentary side view of an alternative belt construction having flat upper and lower cogs.
Figure 5:
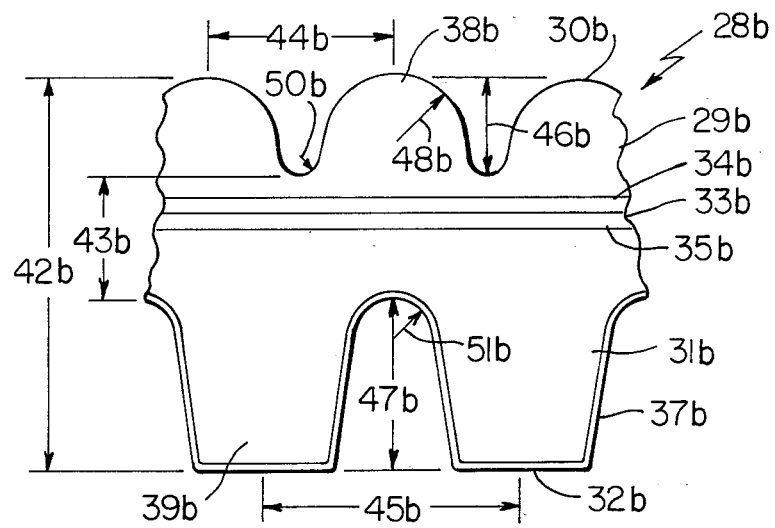
FIG. 5 is an enlarged fragmentary side view of an alternative belt construction having rounded upper cogs and flat lower cogs.
Figure 6:
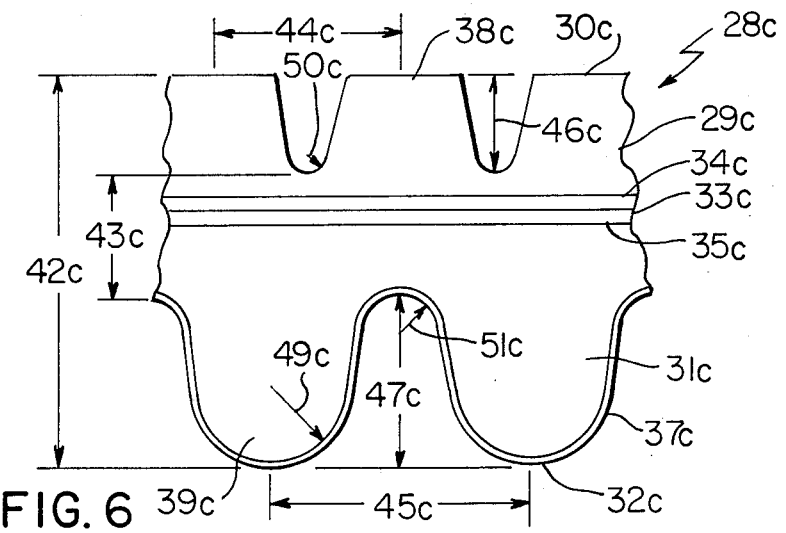
FIG. 6 is an enlarged fragmentary side view of an alternative belt construction having flat upper cogs and rounded lower cogs.

A belt construction of the present invention has flat upper and lower cogs is illustrated in FIG. 4. For convenience, the same identification numbers that are used to identify the structures illustrated in FIG. 3 are used to identify corresponding structures in FIGS. 4, 5 and 6. The identification numbers in FIGS. 4, 5 and 6 are distinguished, respectively, from the numbers used in FIG. 3 by the subscripts a, b and c. It has been found that the alternative belt constructions illustrated in FIGS. 4, 5 and 6 have optimum efficiency in different kinds of vehicles that employ CVT (continuously variable transmission) drives. The specific belt construction having optimum efficiency in a specific vehicle depends on the specific power density (described below) needed in the belt used to drive the vehicle. The power density of the belt required is dependent on the force required to place the vehicle in motion and keep it in motion, the required operating diameter of the belt on the pulleys used, and the speed at which the belt must run in order to provide the drive characteristics desired in the vehicle in which it is used.

Alternative belt constructions in which a belt having rounded upper cogs and flat lower cogs is illustrated in FIG. 5, and a belt having flat upper cogs and rounded lower cogs is illustrated in FIG. 6.

The following table summarizes specific dimensions for a number of endless power transmission belts that have been found to be useful in specific apparati which employ continuously variable transmission devices as will be described in more detail below:

| COGS | | | THICKNESS | | Quotient of B/F Ratio | Quotient Bot/Top Depth | Quotient Bot/Top Pitch |
|---|---|---|---|---|---|---|---|
| Bottom | Top | Width | Belt | Flex | | | |
| F | F | 15/16 | 0.313 | 0.085 | 3.7 | 1.9 | 1.2 |
| R | R | 1⅛ | 0.542 | 0.158 | 3.4 | 2.2 | 1.4 |
| R | R | 1⅜ | 0.700 | 0.221 | 3.2 | 3.0 | 1.8 |
| R | R | 1¼ | 0.680 | 0.201 | 3.4 | 3.0 | 1.8 |
| R | R | 1⅝ | 0.750 | 0.188 | 4.0 | 1.8 | 1.4 |
| R | R | 1 9/16 | 0.625 | 0.241 | 2.6 | 2.2 | 1.4 |
| R | R | 1 9/16 | 0.620 | 0.141 | 4.4 | 3.0 | 1.8 |
| R | R | 2 1/32 | 0.781 | 0.219 | 3.6 | 1.8 | 1.4 |
| R | F | 13/16 | 0.394 | 0.117 | 3.4 | 2.6 | 1.2 |
| R | R | 13/16 | 0.476 | 0.092 | 5.2 | 2.2 | 1.4 |
| R | R | 1¼ | 0.510 | 0.124 | 4.1 | 2.2 | 1.4 |
| R | R | 1 5/32 | 0.510 | 0.124 | 4.1 | 2.2 | 1.4 |
| R | R | 1 18/64 | 0.570 | 0.091 | 6.3 | 3.0 | 1.8 |
| F | R | 2⅜ | 0.844 | 0.235 | 3.6 | 2.0 | 1.5 |
| F | R | 2⅜ | 0.844 | 0.156 | 5.4 | 2.4 | 1.9 |
| F | F | 3 5/16 | 1.012 | 0.255 | 4.0 | 2.9 | 2.1 |
| F | F | 2 13/16 | 1.025 | 0.268 | 3.8 | 2.9 | 2.1 |
| R | R | 1 15/16 | 0.778 | 0.216 | 3.6 | 1.8 | 1.4 |
| R | R | 1 31/32 | 0.683 | 0.121 | 5.7 | 1.8 | 1.4 |
| R | R | 1⅜ | 0.683 | 0.121 | 5.6 | 1.8 | 1.4 |
| R | R | ⅜ | 0.345 | 0.022 | 15.7 | 1.7 | 1.3 |

In the above table, R represents that the cog teeth of the belt construction are rounded, and F represents that the cog teeth are flat. The width, and belt and flex thickness dimensions are in inches.

The dimensions given are optimal; actual belt dimensions may vary due to variables in the belt building process. The belt width may vary by about ±1/32 inch, and the belt thickness may vary by about ±1/32 inch in belts 9/16 inch thick and less, and ±3/64 inch in belts over 9/16 inch thick, and the angle of the sides of the belt may vary by ±2° on the half angle or ±2° on the whole angle in an acceptable belt (flex thickness may vary with the belt thickness since, in many cases, the flex thickness is ultimately determined by the belt thickness and the tooth profile), providing the quotients of the various ratios of the belt measurements, especially the aspect ratio, are maintained accurate to about ±0.2. The outside circumference (O.C.) of a belt of the invention may vary by ⅜ inch in belts having an O.C. up to 30 inches, ±½ inch in belts with an O.C. of 30–60 inches, ±⅝ inch in belts having an O.D. of 60–90 inches and ±¾ inch in belts having an O.C. of 90 inches or more. Belts having the above dimensions within the given tolerances are then tested for their rideout tolerance. The "rideout" is the position where the top of a belt rides relative to the fixed O.D. groove pulley. The position of the "rideout" is a function of the top width of the belt and the angle of the sides of the belt. A belt is acceptable if it rides within ±1/32 inch of the predetermined rideout position.

It was found according to the teachings of this invention that when the top width 41 of the belt construction 28 is approximately 1 and ⅝ inches with the belt thickness being approximately 0.750 of an inch, the top and bottom teeth 38 and 39 should have the following pitch, tooth depth, tooth top radii and root radii when considering a substantially straight section thereof, and the following flex thickness in order to comprise the unique endless power transmission V-belt construction of this invention which is used in a semi-closed drop-in transmission that is used in minicars, wherein the bottom to top tooth pitch quotient is approximately 1.40, the bottom to top tooth depth quotient is approximately 1.77 and the belt thickness to flex thickness quotient is approximately 3.98.

For example, the flex thickness of the particular belt construction 28 of this invention which is used in a transmission as described above, is represented by the reference numeral 43 in FIG. 3 and is approximately 0.188 of an inch.

The pitch of the top teeth 38 of the belt construction 28 of the transmission belt, as represented by the reference numeral 44 in FIG. 3, is approximately 0.3908 of an inch, while the pitch of the bottom teeth 39 is represented by the reference numeral 45 in FIG. 3 and is approximately 0.547 of an inch.

The root depth of the top teeth 38 of the belt construction 28 of the transmission belt is represented by the reference numeral 46 in FIG. 3 and is approximately 0.203 of an inch while the root depth of the bottom teeth 39 is represented by the reference numeral 47 in FIG. 3 and is approximately 0.359 of an inch.

The radius for defining the rounded tips of the top teeth 38 of the belt construction 28 of this invention is represented by radius arrow 48 in FIG. 3 and is approximately 0.141 of an inch in the transmission belt, while the tooth tip radius of the bottom teeth 39 is represented by the radius arrow 49 in FIG. 3 and is approximately 0.156 of an inch.

The root radius of the top teeth 38 of the belt construction 28 of this invention is indicated by the radius arrow 50 in FIG. 3 and is approximately 0.047 of an inch while the root radius of the bottom teeth 39 is indicated by the radius arrow 51 in FIG. 3 and is approximately 0.078 of an inch.

While such a belt construction 28 of this invention can have any suitable length required for a specific use, it has been found that certain continuously variable transmission units 20 for transportation vehicles require belt lengths from approximately 20 inches to approximately 100 inches and require the belt to conform to minimum and maximum diameters 27 and 26 of approximately: 2 inches and 9 inches in scooters and some microcars; 6 inches and 15 inches in some microcars and minicars; and 12 inches and 30 inches in some tractors. Thus, the minimum diameter of the belt flex may be in the range of 2 to 12 inches whereas the maximum diameter is in the range of 9 to 30 inches.

Systems in which CVT belts are used differ in the size of the engine that is used, the length of the center distance between the pulleys in the drive system, the maximum RPM of the drive system and the power of the engine. There are also differences in drive systems with regard to the diameter of the pulleys used in the CVT system, and further, there are differences between pulleys in the amount in which they can expand or contract in size during the driving operation. To obtain optimum performance, the power density of a CVT drive belt must be closely matched with the requirements of a specific drive system. The power density of a belt is a function of the length of the belt, the belt width, the belt thickness, the flex thickness, the depth of the top and bottom cog teeth and the top and bottom cog pitch. It will be apparent to those skilled in the art that some of these factors will have more importance than the others in some specific applications.

For example, in a motor scooter; having a 125 cc engine which produces 8 h.p. maximum output; which employs a drive system that is exposed to atmospheric conditions, and has a center distance of about 6½ inches between the pulleys in the drive system, employs a driven pulley having an O.D. (outside diameter) of about 5½ inches and a driven pulley having an O.D. of about 6⅜ inches, and operates at 6000 rpm (revolutions per minute), maximum; it has been found that a drive belt, having flat upper and lower cogs, an outside circumference of about 26 inches, a belt thickness of about 0.313 inches, a flex thickness of about 0.085 inches, a B/F (belt thickness to flex thickness ratio) quotient of about 3.68, a bot/top (the ratio of the depth of the bottom cogs to the depth of the top cogs) quotient of about 1.92, and a bot/top pitch (the ratio of the pitch of the bottom cogs to the pitch of the top cogs) quotient of about 1.25, provides optimum power density. In the drive system of the motor scooter described above, the drive belt used must also have sufficient flexibility such that it provides optimum performance when in the under-drive condition (the condition at which the CVT pulleys are positioned to gain momentum) the pitch diameter (diameter of the belt as measured at its neutral axis) on the driver pulley is about 2 inches and the pitch diameter on the driver pulley is about 5½ inches; and in the over-drive condition (the condition at which the CVT pulleys are positioned to maintain momentum) the driven pulley has a pitch diameter of about 4½ inches and the driven pulley has a pitch diameter of about 3⅓ inches.

It has been found that the belt construction 28 of this invention with the dimensions previously set forth is suitable for such continuously variable transmission units 20.

Therefore, it can be seen that it is a relatively simple method of this invention to form the belt construction 28 by conventional methods to have the top and bottom teeth 38 and 39 thereof so arranged in relation to the belt thickness 42 and flex thickness 43 to provide a suitable bottom to top tooth pitch quotient, a suitable bottom to top tooth depth quotient, a suitable belt thickness to flex thickness quotient and a specific aspect ratio quotient for specific applications.

Accordingly, it can be seen that this invention not only provides an improved endless power transmission V-belt construction, but also this invention provides an improved method of making such a belt construction.

While the form and method of this invention now preferred have been illustrated and described as required by the Patent Statute, it is to be understood that other forms and method steps can be utilized and still fall within the scope of the appended claims.

What is claimed is:

1. In an endless power transmission V-belt construction formed mainly of polymeric material and having top teeth and bottom teeth respectively extending along the length of the top and bottom surfaces of said belt construction, said belt construction comprising a tension section having said top surface, a compression section having said bottom surface, a load-carrying section disposed intermediate said tension section and said compression section, and the quotient of the top width to belt thickness is about 2-4, the improvement wherein the quotient of the bottom to top tooth pitch is about 1.25, the quotient of the bottom to top tooth depth is about 1.92, the quotient of the belt thickness to flex thickness is about 3.68, the belt thickness is about 0.313 inch, and the flex thickness is about 0.085 inch.

2. A belt construction as set forth in claim 1 wherein at least one of said tension section, load-carrying section and compression section has reinforcing fiber means therein.

3. A belt construction as set forth in claim 1 and including at least one layer of fabric means on at least one of said top surface and said bottom surface.

4. A belt construction as set forth in claim 1 wherein said belt construction is to be utilized for a continuously variable transmission unit such as for a transportation vehicle or the like wherein said belt construction must conform to minimum and maximum diameters of about 2 inches and about 9 inches respectively, said belt construction having a length selected from a range of about 20 inches to about 50 inches.

5. In an endless power transmission V-belt construction formed mainly of polymeric material and having top teeth and bottom teeth respectively extending along the length of the top and bottom surfaces of said belt construction, said belt construction comprising a tension section having said top surface, a compression section having said bottom surface, a load-carrying section disposed intermediate said tension section and said compression section, and the quotient of the top width to belt thickness is about 2-4, the improvement wherein the quotient of the bottom to top tooth pitch is about 1.35, the quotient of the bottom to top tooth depth is about 2.20, the quotient of the belt thickness to flex thickness is about 3.42, the belt thickness is about 0.542 inch, and the flex thickness is about 0.158 inch.

6. A belt construction as set forth in claim 5 wherein at least one of said tension section, load-carrying section and compression section has reinforcing fiber means therein.

7. A belt construction as set forth in claim 5 and including at least one layer of fabric means on at least one of said top surface and said bottom surface.

8. A belt construction as set forth in claim 5 wherein said belt construction is to be utilized for a continuously variable transmission unit such as for a transportation vehicle or the like wherein said belt construction must conform to minimum and maximum diameters of about 2 inches and about 9 inches respectively, said belt construction having a length selected from a range of about 20 inches to about 50 inches.

9. In an endless power transmission V-belt construction formed mainly of polymeric material and having top teeth and bottom teeth respectively extending along the length of the top and bottom surfaces of said belt construction, said belt construction comprising a tension section having said top surface, a compression section having said bottom surface, a load-carrying section disposed intermediate said tension section and said compression section, and the quotient of the top width to belt thickness is about 2-4, the improvement wherein the quotient of the bottom to top tooth pitch is about 1.82, the quotient of the bottom to top tooth depth is about 2.99, the quotient of the belt thickness to flex thickness is about 3.17, the belt thickness is about 0.700 inch, and the flex thickness is about 0.221 inch.

10. A belt construction as set forth in claim 9 wherein at least one of said tension section, load-carrying section and compression section has reinforcing fiber means therein.

11. A belt construction as set forth in claim 9 and including at least one layer of fabric means on at least one of said top surface and said bottom surface.

12. A belt construction as set forth in claim 9 wherein said belt construction is to be utilized for a continuously variable transmission unit such as for a transportation vehicle or the like wherein said belt construction must conform to minimum and maximum diameters of about 2 inches and about 9 inches respectively, said belt construction having a length selected from a range of about 20 inches to about 50 inches.

13. In an endless power transmission V-belt construction formed mainly of polymeric material and having top teeth and bottom teeth respectively extending along the length of the top and bottom surfaces of said belt construction, said belt construction comprising a tension section having said top surface, a compression section having said bottom surface, a load-carrying section disposed intermediate said tension section and said compression section, and the quotient of the top width to belt thickness is about 2–4, the improvement wherein the quotient of the bottom to top tooth pitch is about 1.82, the quotient of the bottom to top tooth depth is about 2.99, the quotient of the belt thickness to flex thickness is about 3.38, the belt thickness is about 0.680 inch, and the flex thickness is about 0.201 inch.

14. A belt construction as set forth in claim 13 wherein at least one of said tension section, load-carrying section and compression section has reinforcing fiber means therein.

15. A belt construction as set forth in claim 13 and including at least one layer of fabric means on at least one of said top surface and said bottom surface.

16. A belt construction as set forth in claim 1 wherein said belt construction is to be utilized for a continuously variable transmission unit such as for a transportation vehicle or the like wherein said belt construction must conform to minimum and maximum diameters of about 2 inches and about 9 inches respectively, said belt construction having a length selected from a range of about 20 inches to about 50 inches.

17. In an endless power transmission V-belt construction formed mainly of polymeric material and having top teeth and bottom teeth respectively extending along the length of the top and bottom surfaces of said belt construction, said belt construction comprising a tension section having said top surface, a compression section having said bottom surface, a load-carrying section disposed intermediate said tension section and said compression section, and the quotient of the top width to belt thickness is about 2–4, the improvement wherein the quotient of the bottom to top tooth pitch is about 1.35, the quotient of the bottom to top tooth depth is about 2.20, the quotient of the belt thickness to flex thickness is about 2.59, the belt thickness is about 0.625 inch, and the flex thickness is about 0.241 inch.

18. A belt construction as set forth in claim 17 wherein at least one of said tension section, load-carrying section and compression section has reinforcing fiber means therein.

19. A belt construction as set forth in claim 17 and including at least one layer of fabric means on at least one of said top surface and said bottom surface.

20. A belt construction as set forth in claim 17 wherein said belt construction is to be utilized for a continuously variable transmission unit such as for a transportation vehicle or the like wherein said belt construction must conform to minimum and maximum diameters of about 2 inches and about 9 inches respectively, said belt construction having a length selected from a range of about 20 inches to about 50 inches.

* * * * *